US010446110B2

(12) United States Patent
Wang et al.

(10) Patent No.: US 10,446,110 B2
(45) Date of Patent: Oct. 15, 2019

(54) DISPLAY DRIVING CIRCUIT AND A DRIVING METHOD THEREOF, A DISPLAY DRIVING SYSTEM AND A DISPLAY APPARATUS

(71) Applicant: BOE Technology Group Co., Ltd., Beijing (CN)

(72) Inventors: Zhicheng Wang, Beijing (CN); Chenfei Qian, Beijing (CN); Qingyong Li, Beijing (CN); Fuliang Sun, Beijing (CN); Tao Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/925,972

(22) Filed: Mar. 20, 2018

(65) Prior Publication Data

US 2019/0130864 A1 May 2, 2019

(30) Foreign Application Priority Data

Oct. 31, 2017 (CN) .......................... 2017 1 1053218

(51) Int. Cl.

*G06F 3/041* (2006.01)
*G09G 3/36* (2006.01)
*G09G 3/3258* (2016.01)

(52) U.S. Cl.

CPC ......... *G09G 3/3696* (2013.01); *G09G 3/3258* (2013.01); *G09G 2320/0673* (2013.01)

(58) Field of Classification Search

CPC .......... G09G 3/3291; G09G 5/06; G09G 5/10; G09G 5/18; G09G 2310/027;

(Continued)

(56) References Cited

U.S. PATENT DOCUMENTS

| | | | | |
|---|---|---|---|---|
| 8,941,568 B2 | 1/2015 | Zhao | | |
| 2003/0067435 A1* | 4/2003 | Liu | ...................... | G09G 3/3406 345/101 |

(Continued)

FOREIGN PATENT DOCUMENTS

| | | |
|---|---|---|
| CN | 1949356 A | 4/2007 |
| CN | 101567170 A | 10/2009 |

(Continued)

OTHER PUBLICATIONS

Copy of Office Action, including Search Report, for Chinese Patent Application No. 201711053218.3, dated Aug. 1, 2019, 15 pp.

*Primary Examiner* — Nelson M Rosario

(74) *Attorney, Agent, or Firm* — Westman, Champlin & Koehler, P.A.

(57) ABSTRACT

Embodiments of the present disclosure provide a display driving circuit, a driving method thereof, a display driving system and a display apparatus. The display driver circuit comprises a processor, a storage and a grey scale voltage generator. The storage is configured to store at least two gamma curves, wherein each of the at least two gamma curves is associated with a range of temperature. The processor is configured to obtain a current environment temperature, to determine a range to which the current environment temperature belongs based on the current environment temperature; to retrieve the gamma curve associated with the range determined from the storage, and to output the retrieved gamma curve to the grey scale voltage generator.

18 Claims, 8 Drawing Sheets

(58) Field of Classification Search
CPC ......... G09G 2320/0673; G09G 3/2011; G09G 3/3648; G09G 3/3696; G09G 2320/0252; G09G 2320/041; G09G 2330/12
See application file for complete search history.

(56) References Cited

U.S. PATENT DOCUMENTS

| | | | | |
|---|---|---|---|---|
| 2010/0277519 | A1 | 11/2010 | Lee | |
| 2016/0012763 | A1* | 1/2016 | Chen .................... | G09G 3/3696 345/690 |
| 2016/0307485 | A1 | 10/2016 | Ma et al. | |

FOREIGN PATENT DOCUMENTS

| | | | |
|---|---|---|---|
| CN | 201829172 | U | 5/2011 |
| CN | 202183220 | U | 4/2012 |
| CN | 103956144 | A | 7/2014 |
| CN | 106601202 | A | 4/2017 |

* cited by examiner

DISPLAY DRIVING CIRCUIT AND A DRIVING METHOD THEREOF, A DISPLAY DRIVING SYSTEM AND A DISPLAY APPARATUS

CROSS-REFERENCE TO RELATED APPLICATION(S)

This application claims the benefit of Chinese Patent Application No. 201711053218.3, filed on Oct. 31, 2017, the entire contents of which are incorporated herein by reference.

TECHNICAL FIELD

The disclosure relates to a field of display technology, and in particular, to a display driving circuit and a driving method thereof, a display driving system and a display apparatus.

BACKGROUND

TFT-LCD (Thin Film Transistor Liquid Crystal Display) or Organic Light Emitting Diode (OLED) displays, as a flat panel display device, have advantages of small size, low power consumption, no radiation and a relatively low cost and the like. Thus, they have been increasingly used in a high performance display field.

SUMMARY

Embodiments of the present disclosure provide a display driving circuit and a driving method thereof, a display driving system and a display apparatus.

According to an aspect of the embodiments of the present disclosure, there is provided a display driving circuit, comprising: a processor, a storage and a grey scale voltage generator. The storage is configured to store at least two gamma curves, wherein each of the at least two gamma curves is associated with a range of temperature. The grey scale voltage generator is electronically connected to the processor. The processor is configured to obtain a current environment temperature, to determine a range to which the current environment temperature belongs based on the current environment temperature; to retrieve the gamma curve associated with the range determined from the storage, and to output the retrieved gamma curve to the grey scale voltage generator.

For example, the display driving circuit may further comprise a source driver, and the processor is provided with a timing controlling signal port for outputting a timing controlling signal, and the source driver is electronically connected to the processor through the timing controlling signal port.

For example, the processor is further provided with a pulse width modulation signal port.

For example, the display driving circuit may further comprise a source diver, wherein the processor is electronically connected to the source driver through three channels of low voltage differential data lines disposed in parallel.

For example, the storage is electronically connected to the source driver and configured to store a low voltage differential signal; wherein the processor is configured to address progressively data signals for sub-pixels among the low voltage differential signal stored in the storage.

For example, the display driving circuit may further comprise a source driver, and the processer is electronically connected to the source driver through six channels of low voltage differential data lines disposed in parallel.

For example, the storage comprises a first sub-storage for odd-numbered channels and a second sub storage for even-numbered channels; the first sub storage is configured to storage the low voltage differential signal and electronically connected to the source driver; and the processor is configured to address progressively the data signals for sub-pixels of odd-numbered pixel units among the low voltage differential signal stored in the first sub storage; and the second sub storage is configured to storage the low voltage differential signal; and the processor is configured to address progressively the data signals for sub pixels of even-numbered pixel units among the low voltage differential signal stored in the second sub storage.

For example, the display driving circuit may further comprise a power module electronically connected to the processor and the grey scale voltage generator and configured to provide an operating voltage to the processor and the grey scale voltage generator.

For example, the processor is implemented as a Field Programmable Gate Array chip.

According to another aspect of the embodiments of the present disclosure, there is provided a display driving system, comprising a main driver and the display driving circuit of any of above examples; wherein the main driver is connected to the processor of the display driving circuit through an interface for a low voltage differential signal.

According to another aspect of the embodiments of the present disclosure, there is provided a display apparatus comprising the display driving system of any of above examples.

For example, the display apparatus may further comprise a display panel, and the display driving circuit in the display driving system is disposed in a non-display area of the display panel.

For example, the display apparatus may further comprise a driving board, and the main driver in the display driving system is disposed on the driving board.

For example, the display apparatus may further comprise a backlight module, and the processor of the display driving circuit in the display driving system is provided with a pulse width modulation signal port, wherein the backlight module is electronically connected to the processor through the pulse width modulation signal port.

According to another aspect of the embodiments of the present disclosure, there is provided a method of driving the display driving circuit of any of above examples, comprising: storing at least two gamma curves, wherein each of the at least two gamma curves is associated with a range of temperature; obtaining a current environment temperature; and determining a range to which the current environment temperature belongs, based on the current environment temperature; retrieving the gamma curve associated with range determined from the stored at least two gamma curves, and outputting the retrieved gamma curve to a grey scale voltage generator.

For example, the method may further comprise outputting a timing controlling signal.

For example, the method may further comprise outputting a pulse width modulation signal.

For example, the method may further comprise: storing the low voltage differential signal; addressing progressively data signals for sub-pixels of odd-numbered pixel units among the low voltage differential signal, and outputting the data signals for sub pixels with one color of the odd-numbered pixel units in a row of pixel units to a source driver through a channel of low voltage differential data line one by one; and addressing, simultaneously, the data signal for sub pixels of even-numbered pixel units among the low voltage differential signal progressively, and outputting the data signal for sub pixels with one color of the even-numbered pixel units in a row of pixel units to the source driver through a channel of low voltage differential data line one by one.

According to another aspect of the embodiments of the present disclosure, there is provided a computer device comprising a memory and a processor, the memory storing a computer program executable by the processor, and when executed by the processor, the computer program causes the processor to implement the method of any of above examples.

According to another aspect of the embodiments of the present disclosure, there is provided a computer readable medium storing instructions that, when executed by a processor, implement the method of any of above examples.

BRIEF DESCRIPTION OF THE DRAWINGS

In order to illustrate embodiments of the present disclosure or the prior art, drawings which are used in the description of the embodiments or the prior art will be briefly described herein. It will be apparent that the drawings in the following description are merely some of embodiments of the present disclosure, those skilled in the art would obtain other drawings in view of the drawings illustrated herein without making a creative effort.

DETAILED DESCRIPTION

The embodiments of the present disclosure will now be described in conjunction with the accompanying drawings in the present disclosure. It will be apparent that the described embodiments are merely part of the embodiments of the present disclosure and not all of the embodiments. All other embodiments obtained by those of ordinary skill in the art without making creative work are within the scope of this disclosure, based on the embodiments of the present disclosure.

It should also be noted that, in this context, terms such as "first," "second," and the like used herein may be used to distinguish one element from another element, which does not require or imply that any such actual relationship or order exists between these entities or operations. Thus, a feature defined by the terms such as "first," "second," and the like may explicitly or implicitly include one or more of the features. In the description of the present disclosure, terms such as "a plurality of" mean two or more unless otherwise specified.

In addition, the term "a valid operating level" refers to a level at which a relevant signal can drive relevant components to perform corresponding operations. In the following embodiments, the description will be made by taking the "valid operating level" as a relatively high level for an example.

In a manufacturing process of the display apparatus, after some of setting parameters of the display apparatus are determined, the setting parameters cannot be changed after shipment. In this case, after the usage environment of the display apparatus, such as temperature, changes, the setting parameters of the display apparatus cannot change with the change of the environment, thereby affecting the display effect.

According to an aspect of the embodiments of the present disclosure, there is provided a display driving circuit 01, comprising: a processor 10, a grey scale voltage generator 20 and a storage 30. The storage 30 is configured to store at least two gamma curves, wherein each of the at least two gamma curves is associated with a range of temperature. The grey scale voltage generator 20 is electronically connected to the processor 10. The processor 10 is configured to obtain a current environment temperature, to determine a range to which the current environment temperature belongs based on the current environment temperature; to retrieve the gamma curve associated with the range determined from the storage, and to output the retrieved gamma curve to the grey scale voltage generator 20.

The gray level voltage generator 20 can generate a series of reference gray level voltages based on the gamma curves of the display apparatus provided with the display driving circuit 01 described above, wherein the gamma curve is a curve indicating a relationship between the input voltage for a sub-pixel and its corresponding brightness.

Figure 1A:
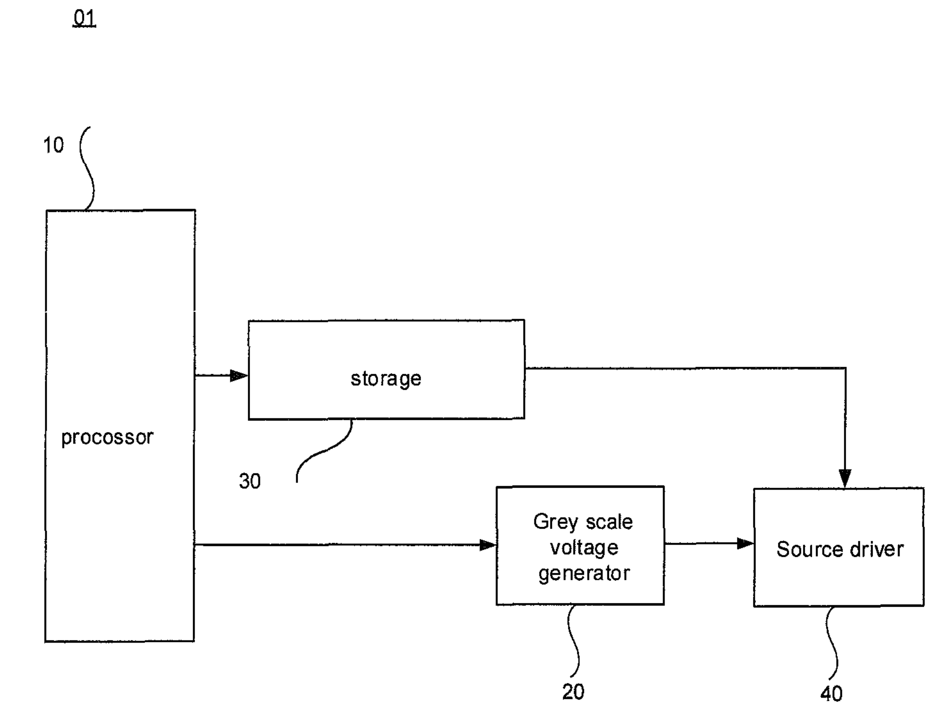
FIG. 1*a* shows a schematic structural diagram of a display driving circuit according to an embodiment of the present disclosure.

As shown in FIG. 1A, the display driving circuit 01 may further include a source driver 40. The gray level voltage generator 20 is electronically connected to the source driver 40 which is further electronically connected to a data line of a display apparatus comprising the display driving circuit according to the embodiment of the present disclosure. For example, after the plurality of reference gray level voltages generated by the gray level voltage generator 20 are delivered to a buffering circuit, they are then input to the source driver 40. Based on this, for an 8-bit source driver 40, the plurality of reference gray level voltages can be equally divided by 16 to generate a gray level voltage having a total number of 256 levels. The source driver 40 generates a data voltage by using the gray level voltage corresponding to a luminance component carried by the displaying signal for the sub-pixel, and charges the sub-pixel to display the image.

For example, the processor 10 may be implemented as an FPGA (Field Programmable Gate Array) chip.

A plurality of pixel units arranged in a matrix form may be disposed in a display area of a display panel. For example, at least three sub-pixels may be included in each pixel unit. For example, each pixel unit may comprise a red (R) sub-pixel, a green (G) sub-pixel, and a blue (B) sub-pixel, or a cyan sub-pixel, a magenta sub-pixel, and a yellow sub-pixel. For another example, one pixel unit may comprise a red (R) sub-pixel, a green (G) sub-pixel, a blue (B) sub-pixel, and a white (W) sub-pixel. In the following, for convenience of description, the description is made by taking as an example of including the red (R) sub-pixel, the green (G) sub-pixel and the blue (B) sub-pixel in one pixel unit.

Due to different display environments in which the display apparatus is located, such as, different display environments with different temperatures, light emission characteristics of the red (R) sub-pixel, the green (G) sub-pixel and the blue (B) sub-pixel of the same pixel unit in the display apparatus are different. Therefore, when the sub-pixels with different colors are receiving the same data voltage, there is a large difference in the displayed gray level values. Therefore, under different ambient temperatures, for example, a high temperature, a normal temperature and a low temperature, the display apparatus is provided with three different gamma curves, each of which is associated with an ambient temperature, so as to facilitate an operation of the display driving circuit 01 based on the ambient temperature. By selecting a gamma curve that is associated with a certain ambient temperature and correcting the display image based on the gamma curve, it is possible to reduce the difference in the gray level.

According to an embodiment of the present disclosure, the storage 30 may store at least two gamma curves, and each of the gamma curves is associated with a range of temperature. For example, when the display apparatus provided with the display driving circuit 01 can operate at a high temperature (for example, 100° C. or higher), a normal temperature (20-25° C.) and a low temperature (0-4° C.) respectively, the storage 30 may store a first gamma curve associated with a high temperature environment, a second gamma curve associated with a normal temperature environment and a third gamma curve associated with a low temperature environment, respectively.

Based on this, when the display apparatus displays at any one of the ambient temperatures, by using a gamma curve associated with the ambient temperature, it is possible to reduce the difference in gray level.

Figure 1B:
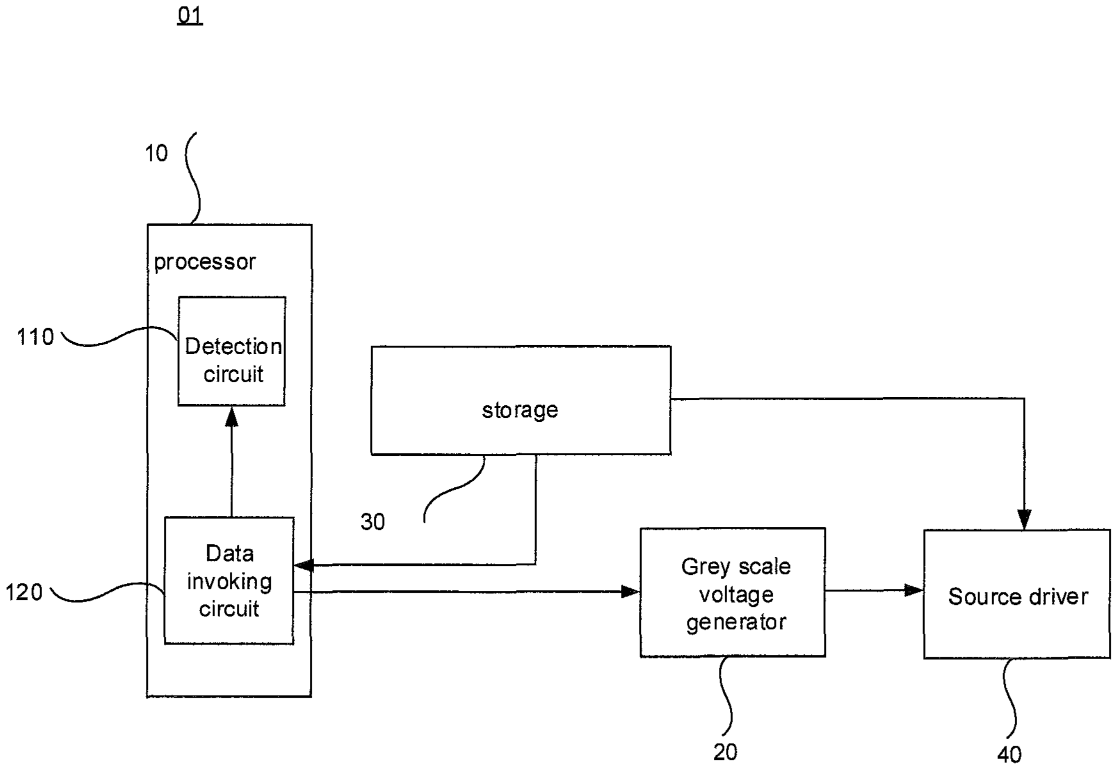
FIG. 1*b* shows a schematic structural diagram of a display driving circuit according to an embodiment of the present disclosure.

The processor 10 is electronically connected to the gray level voltage generator 20 and the storage 30. As shown in FIG. 1B, the processor 10 may be implemented to include a detection circuit 110 and a data invoking circuit 120 according to its function. The detection circuit 110 is configured to acquire a current ambient temperature. The data invoking circuit 120 is connected with the storage 30. The data invoking circuit 120 is configured to determine the range to which the current ambient temperature belongs according to the current ambient temperature. For example, the data invoking circuit 120 may determine whether the current temperature environment belongs to the high temperature, the normal temperature, or the low temperature.

In addition, the above-mentioned data invoking circuit 120 also retrieves a gamma curve associated with the range to which the current ambient temperature belongs from the storage 30. The data invoking circuit 120 can be electronically connected to the gray level voltage generator 20 through an I2C interface, so that the above retrieved gamma curve can be output to the gray level voltage generator 20 as an I2C controlling signal.

When the ambient temperature changes, even the red (R) sub-pixel, the green (G) sub-pixel and the blue (B) sub-pixel of the same pixel unit have different light emission characteristics since the display apparatus is affected by the external environment, the data invoking circuit 120 may invoke the gamma curve associated with the current ambient temperature from the storage 30 and output it to the gray level voltage generator 20. Thus, the gray level voltage generator 20 can provide the source driver 40 with a reference gray level voltage according to the gamma curve corresponding to the current ambient temperature. Next, the source driver 40 may provide the data voltages to the respective sub-pixels according to the display signals for the sub-pixels based on the gray level reference voltages described above, so as to effectively reduce the difference in the gray level displayed when the same data voltage is received by sub-pixels with different colors.

Figure 2:
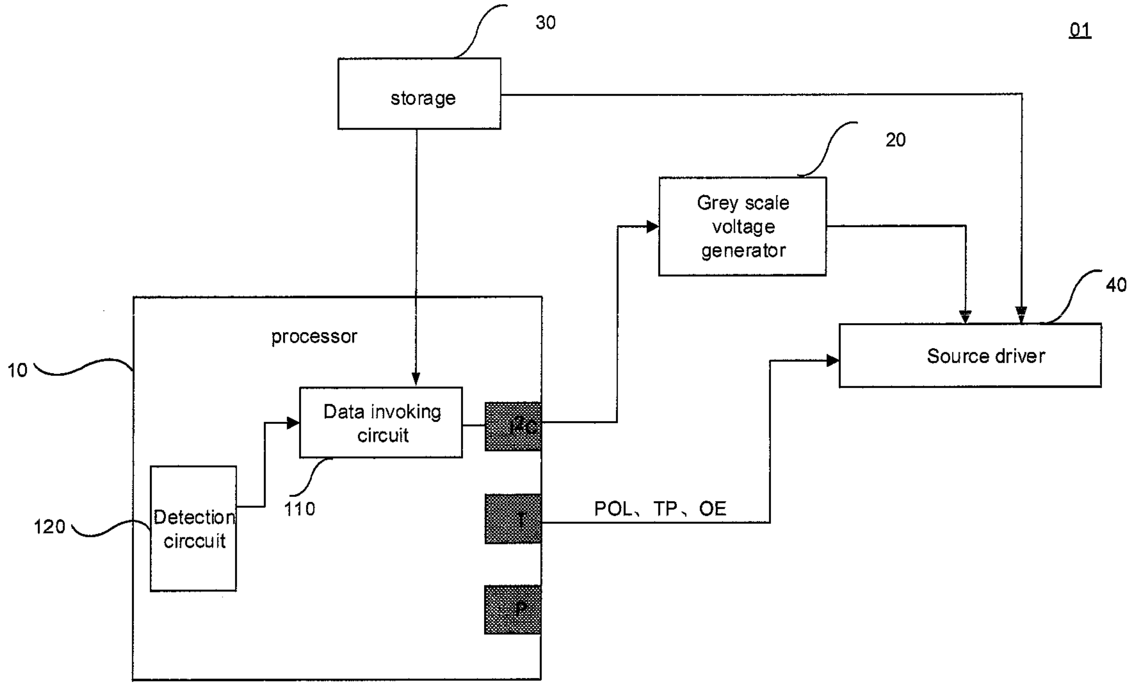
FIG. 2 shows a schematic structural diagram of another display driving circuit according to an embodiment of the present disclosure.

As shown in FIG. 2, the processor 10 is further provided with a timing controlling signal port T for outputting a timing controlling signal. The source driver 40 is also connected to the processor 10 through the above timing controlling signal port T.

The following describes a process of providing the timing controlling signal from the processor 10 to the source driver 40 through the timing controlling signal port T.

For example, when the display apparatus provided with the display driving circuit 01 is a liquid crystal display apparatus, liquid crystals can be driven in polarity inversion manner so as to avoid the aging of the liquid crystals. In this case, the processor 10 may send a flipping signal POL for controlling the flip of the liquid crystal and a data transmission controlling signal TP to the processor 10 through the timing controlling signal port T. The processor 10 can achieve different types of flipping by controlling a duty cycle of the flipping signal POL according to the user's requirement.

Figure 3A:
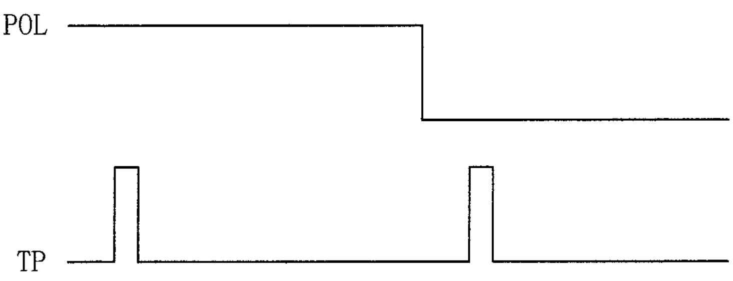
FIG. 3*a* shows a timing diagram of the controlling signal output from the timing controlling signal port in FIG. 2.
Figure 3B:
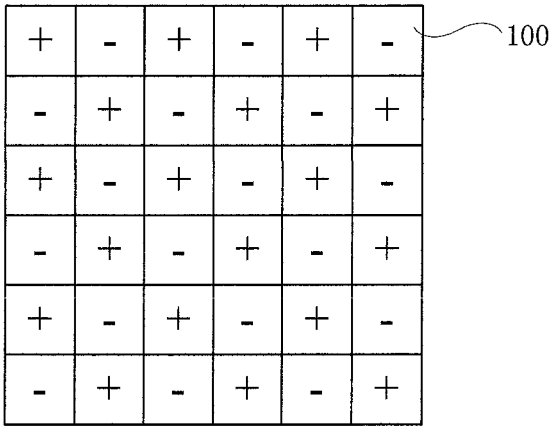
FIG. 3*b* show a schematic diagram of polarity inversion using a timing signal shown in FIG. 3*a;*

For example, as shown in FIG. 3*a*, the data transmission controlling signal TP has a high level during the flipping signal POL is at a high level. The data transmission controlling signal TP has another high level during the flipping signal POL is at a low level. At this time, as shown in FIG. 3*b*, the sub-pixel 100 in the liquid crystal display apparatus adopts a 1×1 dot flip (i.e., dot flip) mode. In this case, the power consumption of the liquid crystal display apparatus during the display process is relatively large.

Figure 4A:
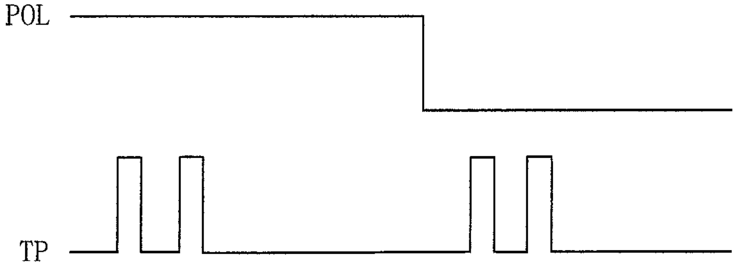
FIG. 4*a* shows another timing diagram of the controlling signal output by the timing controlling signal port in FIG. 2.
Figure 4B:
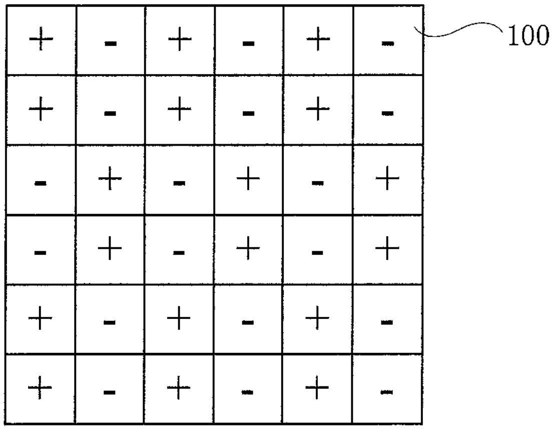
FIG. 4*b* shows a schematic diagram of polarity inversion of the timing signal shown in FIG. 4*a;*

Alternatively, as shown in FIG. 4*a*, the data transmission controlling signal TP has two high levels when the flipping signal POL is at a high level. The data transmission controlling signal TP has two high levels during the flipping signal POL is at a low level. In this case, as shown in FIG. 4*b*, the sub-pixel 100 in the liquid crystal display apparatus adopts a 1+2 line flip mode. Compared with the flip mode shown in FIG. 3*b*, the power consumption of the liquid crystal display apparatus during the display process is smaller.

Figure 5A:
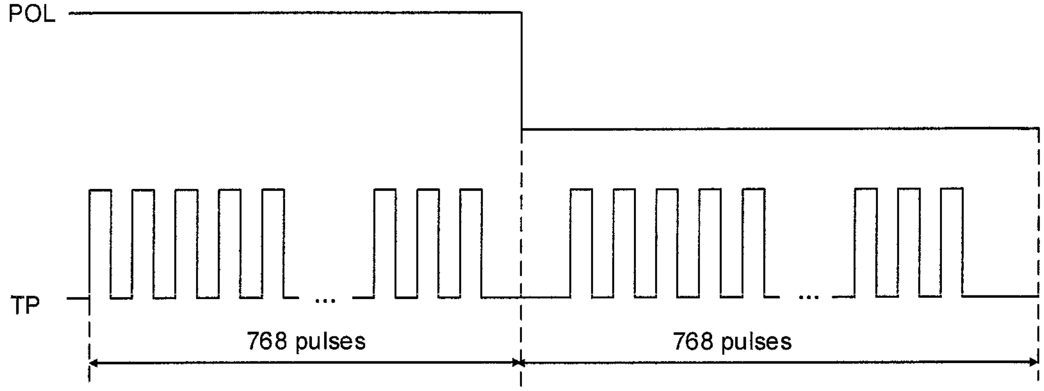
FIG. 5*a* shows another timing diagram of the controlling signal output by the timing controlling signal port in FIG. 2.
Figure 5B:
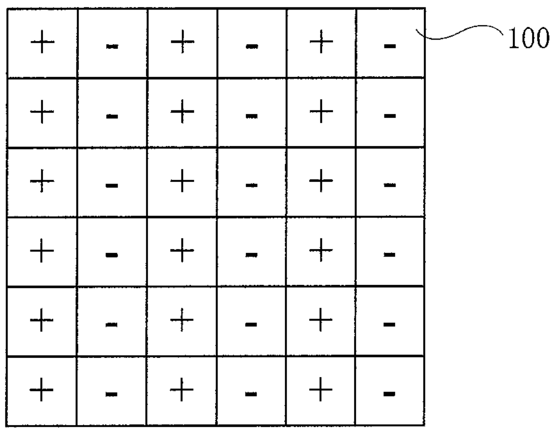
FIG. 5*b* shows a schematic diagram of polarity inversion of the timing signal shown in FIG. 5*a;*

Alternatively, taking the display apparatus with a resolution of 1024×768 as an example, as shown in FIG. 5*a*, the data transmission controlling signal TP has 768 high levels during the flipping signal POL is at a high level. During the flipping signal POL is at a low level, the data transmission controlling signal TP has 768 high levels. In this case, as shown in FIG. 5*b*, the sub-pixels 100 in the liquid crystal display apparatus adopts a column inversion mode. Compared with the flip modes shown in FIG. 3*b* and FIG. 4*b*, the power consumption of the liquid crystal display apparatus during the display process is smaller.

In summary, those skilled in the art can adjust the flip mode of the liquid crystal by controlling the duty cycle of the flipping signal POL and the number of pulses of the data transmission controlling signal TP so as to achieve a balance between the display effect and the power consumption.

In addition, for example, the timing controlling signal supplied from the processor 10 to the source driver 40 through the timing controlling signal port T may also be the clipping controlling signal OE2. The processor 10 can control the duty cycle of the clipping controlling signal OE2, so that the high-level power supply voltage VGH provided by the driver IC (Power IC) to the display apparatus can smoothly and slowly switch to the low-level power supply voltage VGL. Therefore, for a display apparatus with a relatively high resolution, it is possible to reduce an influence of an abrupt voltage change on the screen.

In addition, as shown in FIG. 2, the processor 10 is further provided with a pulse width modulation signal (PPWM) port P.

In this case, for example, when the backlight module in the display apparatus is connected to the processor 10 through the pulse width modulation signal port P, the processor 10 can modulate the brightness of the backlight module by adjusting the duty cycle of the PWM signal outputted by the pulse-width modulation signal port P, to meet requirements of different users. For example, on a cloudy day, the user requires the backlight module to emit a brighter light, and on a sunny day, the user requires the backlight module to emit a darker light.

In addition, the processor 10 may also output the data signal for displaying for each sub-pixel to the source driver 40.

Figure 6:
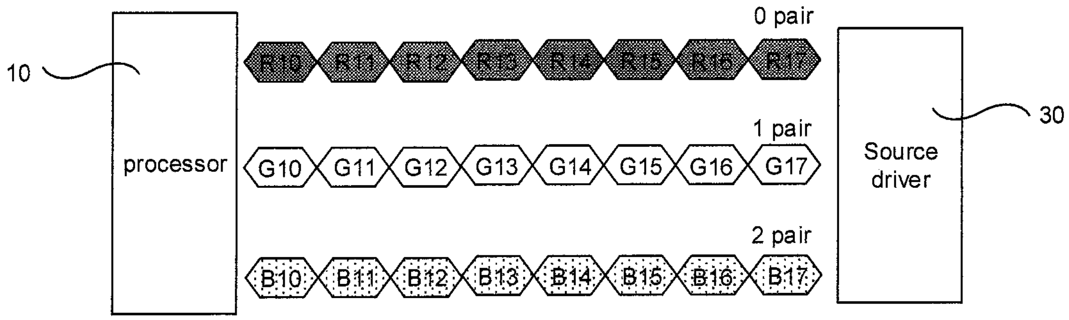
FIG. 6 shows a schematic diagram of a signal transmission method between the processor and the source driver in FIG. 1 or FIG. 2.
Figure 7:
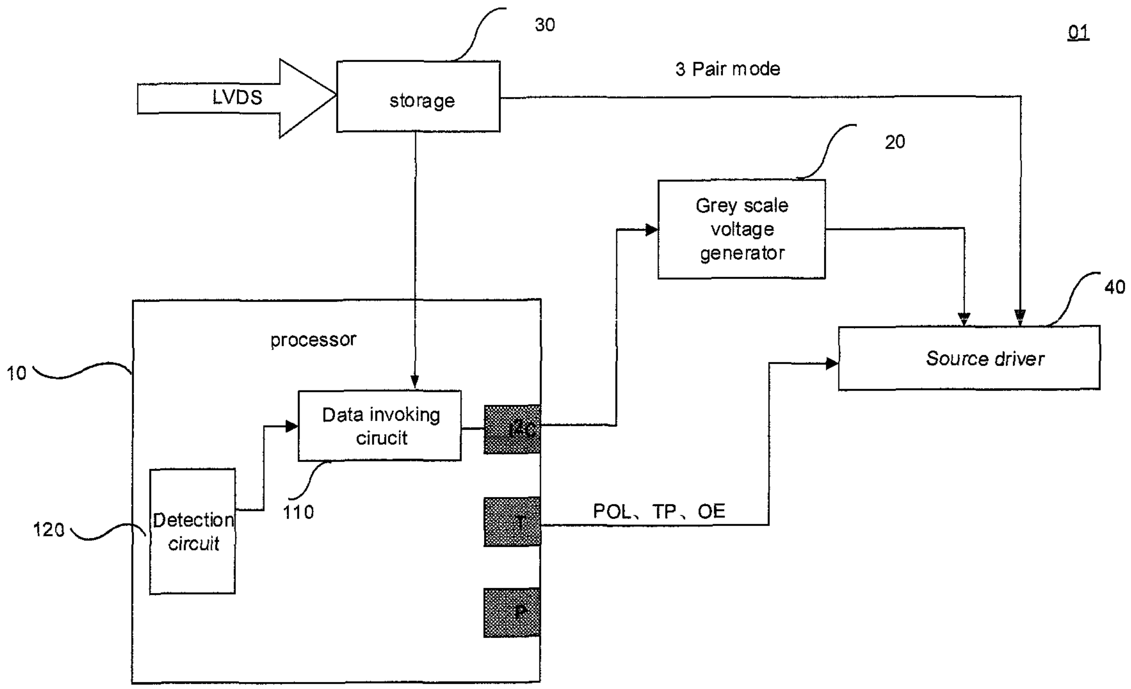
FIG. 7 shows a schematic structural diagram of a processor for implementing the signal transmission method shown in FIG. 6.

According to the embodiment of the disclosure, as shown in FIG. 6, the processor 10 is electronically connected to the source driver 40 through three channels of low voltage differential (Mini_LVDS) data lines (0pair, 1pair and 2pair) disposed in parallel According to the embodiment of the disclosure, the storage 30 may further a low voltage differential signal (LVDS). The processor 10 can address the data signal for sub-pixels stored in the storage 30 progressively. Further, the storage 30 may also output the addressed data signal to the source driver 40 under the control of the processor 10.

Based on this, taking a display panel with a resolution of 1024×768 as an example, the processor 10 may transmit data to the source driver 20 through the three channels of low voltage differential (Mini_LVDS) data lines (0pair, 1 pair and 2pair), as shown in Table 1.

TABLE 1

| | 3 pairs | Data transmitted through a channel of Mini_LVDS data line |
|---|---|---|
| all pixels | 0 | R10, R11, R12, R13, R14, R15, R16, R17, R20, R21, R22, R23 . . . R10240, R10241 . . . R10247 |
| | 1 | G10, G11, G12, G13, G14, G15, G16, G17, G20, G21, G22, G23 . . . G10240, G10241 . . . G10247 |
| | 2 | B10, B11, B12, B13, B14, B15, B16, B17, B20, B21, B22, B23 . . . B10240, B10241 . . . B10247 |

Figure 8:
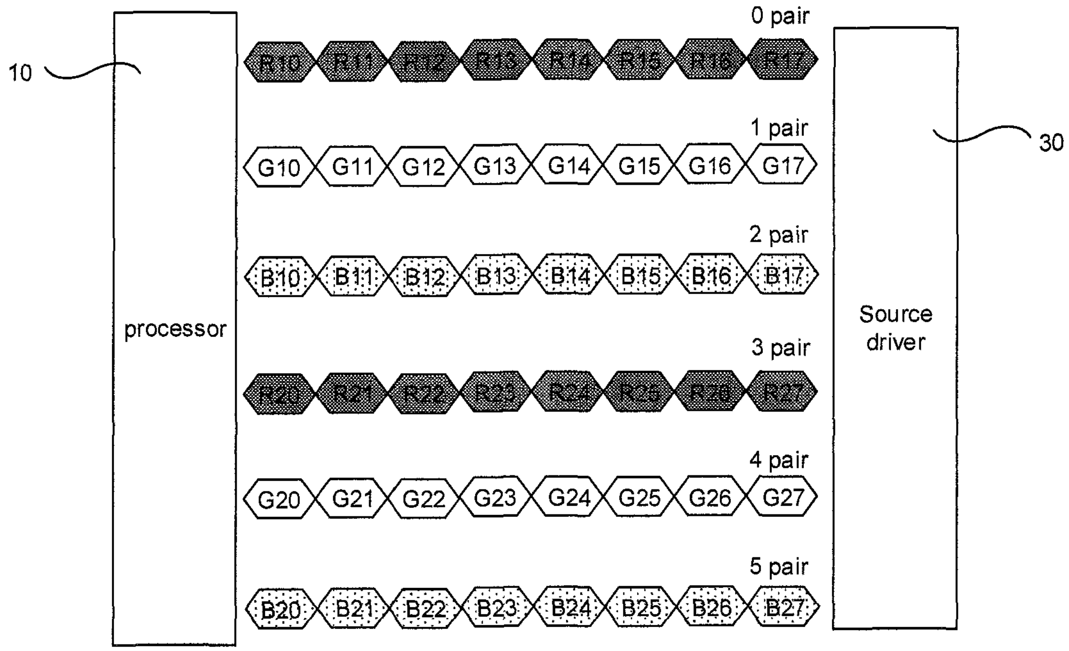
FIG. 8 shows a schematic diagram of another signal transmission method between the processor and the source driver in FIG. 1 or FIG. 2.

For example, as shown in FIG. 8, the processor 10 is connected to the source driver 40 through six channel of low voltage differential (Mini_LVDS) data lines (0pair, 1pair, 2pair, 3pair, 4pair, 5pair) disposed in parallel.

Figure 9:
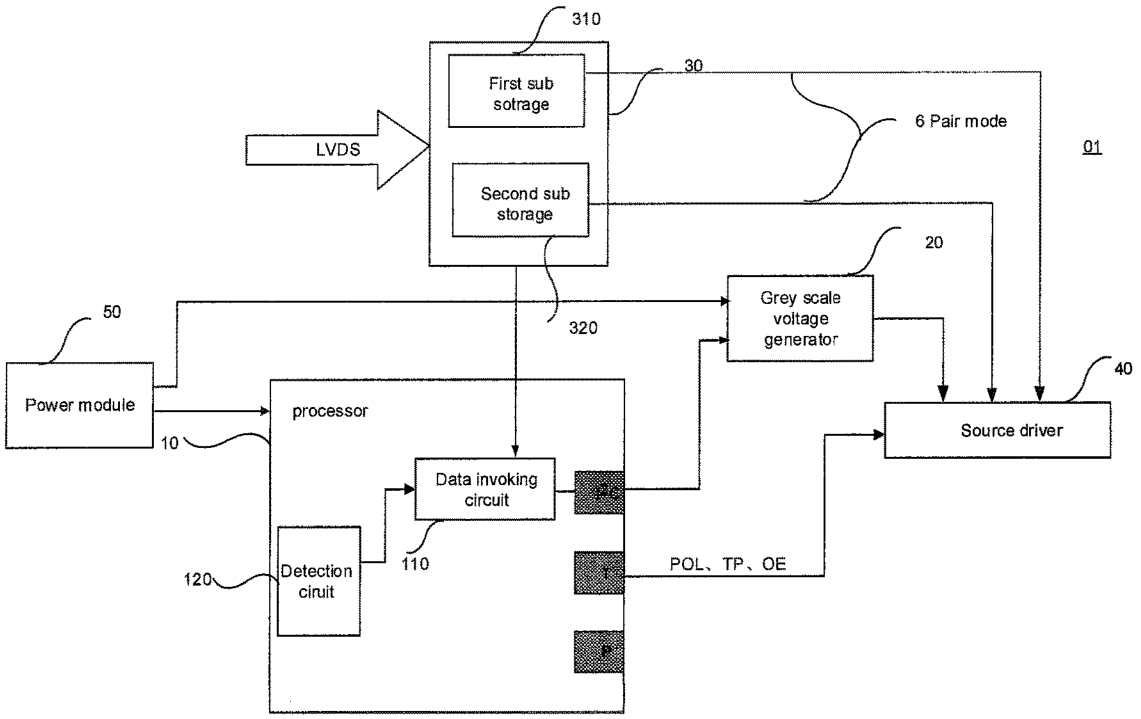
FIG. 9 shows a schematic structural diagram of a processor for implementing the signal transmission method shown in FIG. 8.

In this case, as shown in FIG. 9, the storage 30 may include a first sub-storage 310 for odd-numbered channels and a second sub storage 320 for even-numbered channels.

Figure 10:
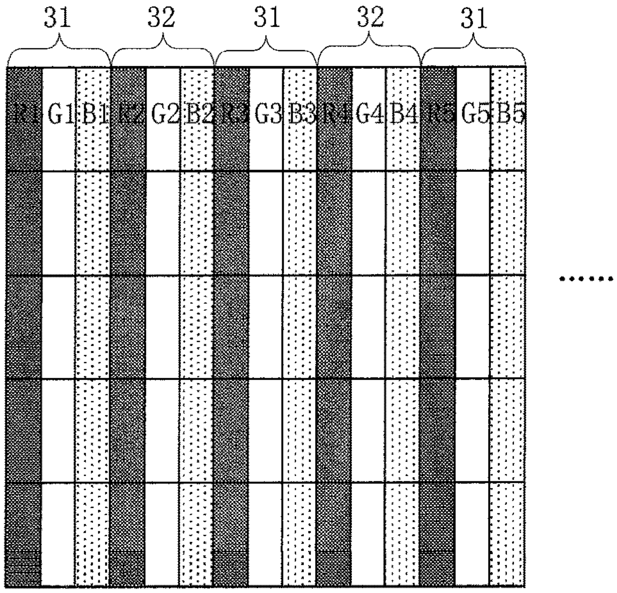
FIG. 10 shows a schematic structural diagram of a pixel unit in a display apparatus.

The first sub storage 310 is configured to storage the low voltage differential signal LVDS. As shown in FIG. 10, the processor 10 is configured to address progressively the data signals for sub-pixels of odd-numbered pixel units 31 among the low voltage differential signal stored in the first sub storage 310. In addition, the first sub storage 310 is connected to the source driver 40 and configured to outputs the addressed data signal to the source driver 40 under the control of the processor 10.

In addition, the second sub storage 320 is configured to storage the low voltage differential signal LVDS. As shown in FIG. 10, the processor 10 is configured to address progressively the data signals for sub-pixels of even-numbered pixel units 31 among the low voltage differential signal stored in the second sub storage 320. In addition, the second sub storage 320 is connected to the source driver 40 and configured to outputs the addressed data signal to the source driver 40 under the control of the processor 10.

Taking a display panel with a resolution of 1024×768 as an example, the first sub storage 310 transmits data to the source driver 40 through the three channel (0pair, 1 pair, 2pair) of odd-numbered low-voltage differential (Mini_LVDS) data lines disposed in parallel. The second sub storage 320 transmits data to the source driver 40 through the three channel (3pair, 4pair, 5pair) of even-numbered low-voltage differential (Mini_LVDS) data lines disposed in parallel as shown in Table 2.

TABLE 2

| | 6 pairs | Data transmitted through a channel of Mini_LVDS data line |
|---|---|---|
| odd-numbered pixel unit | 0 | R10, R11, R12, R13, R14, R15, R16, R17, R30, R31, R32, R33 . . . R10230, R10231 . . . R10237 |
| | 1 | G10, G11, G12, G13, G14, G15, G16, G17, G30, G31, G32, G33 . . . G10230, G10231 . . . G10237 |
| | 2 | B10, B11, B12, B13, B14, B15, B16, B17, B30, B31, B32, B33 . . . B10230, B10231 . . . B10237 |
| even-numbered pixel unit | 3 | R20, R21, R22, R23, R24, R25, R26, R27, R40, R41, R42, R43 . . . R10240, R10241 . . . R10247 |
| | 4 | G20, G21, G22, G23, G24, G25, G26, G27, G40, G41, G42, G43 . . . G10240, G10241 . . . G10247 |
| | 5 | B20, B21, B22, B23, B24, B25, B26, B27, B40, B41, B42, B43 . . . B10240, B10241 . . . B10247 |

In view of above, when the first sub storage 310 and the second sub storage 320 simultaneously transmit data to the source driver 40, the 6-channel (6pairs) of Mini LVDS data lines can simultaneously perform data transmission, so that sub-pixels with the same color of the odd-numbered pixel units 31 and the even-numbered pixel units 32 adjacent to each other in the same row can simultaneously receive data signals for displaying. For example, while the red sub-pixel R1 in the odd-numbered pixel unit 31 sequentially receives the data signal of R10, R11, R12, R13, R14, R15, R16 and R17, the red sub-pixel R2 in the even-numbered pixel unit 32 adjacent to the odd-numbered pixel unit 31 may receive the data signal of R20, R21, R22, R23, R24, R25, R26 and R27.

In this case, compared with a 3-pair mode as shown in Table 1, the 6-pair mode has a higher efficiency for data transmission. Therefore, for a display panel with a higher resolution, the data signal for sub-pixels in one row can be written into each sub-pixel completely and accurately in a certain scanning time.

It should be noted that, the odd-numbered pixel units 31 refer to pixel units located in an odd-numbered column among one row of pixel units. For example, the odd-numbered pixel units 31 described above refers to the pixel units located in the first column, the third column, the fifth column and the like. Similarly, the even-numbered pixel units 32 refer to pixel units located in an even-numbered column among one row of pixel units. For example, the even-numbered pixel units 32 described above refers to the pixel units located in the second column, the fourth column, the sixth column and the like.

In addition, the storage 30 can be implemented as various media capable of storing program codes, such as a ROM and a RAM.

In summary, the processor 10, such as an FPGA chip, can replace the timing control (Ton) circuit in the display apparatus. As a result, compared with the Ton circuit, the FPGA chip can have a variety of open functions to meet the diverse requirements of users.

As shown in FIG. 9, the display driving circuit 01 may further include a power module 50. The power module 50 is connected to the processor 10 and the gray level voltage generator 20 for providing the operating voltage to the processor 10 and the gray level voltage generator 20.

Figure 11:
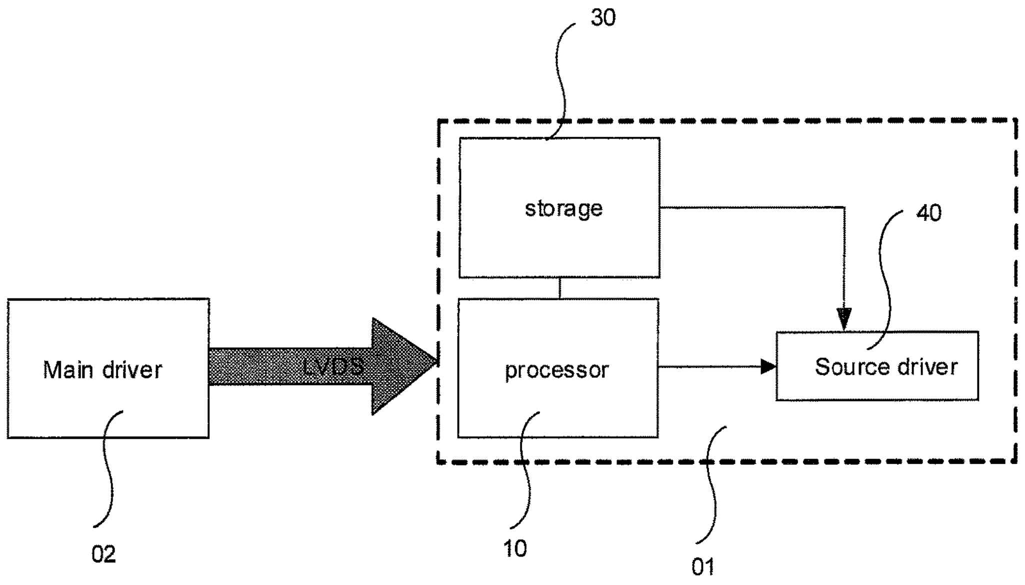
FIG. 11 shows a schematic structural diagram of a display driving system according to an embodiment of the present disclosure.

The embodiments of the present disclosure provide a display driving system. As shown in FIG. 11, the display driving system according to an embodiment of the present disclosure may include a main driver 02 and the display driving circuits 01 of any of embodiments described above, wherein the main driver 02 is connected to the processor 10 in the display driving circuits 01 described above through the low voltage differential signal (LVDS) interface.

Figure 12:
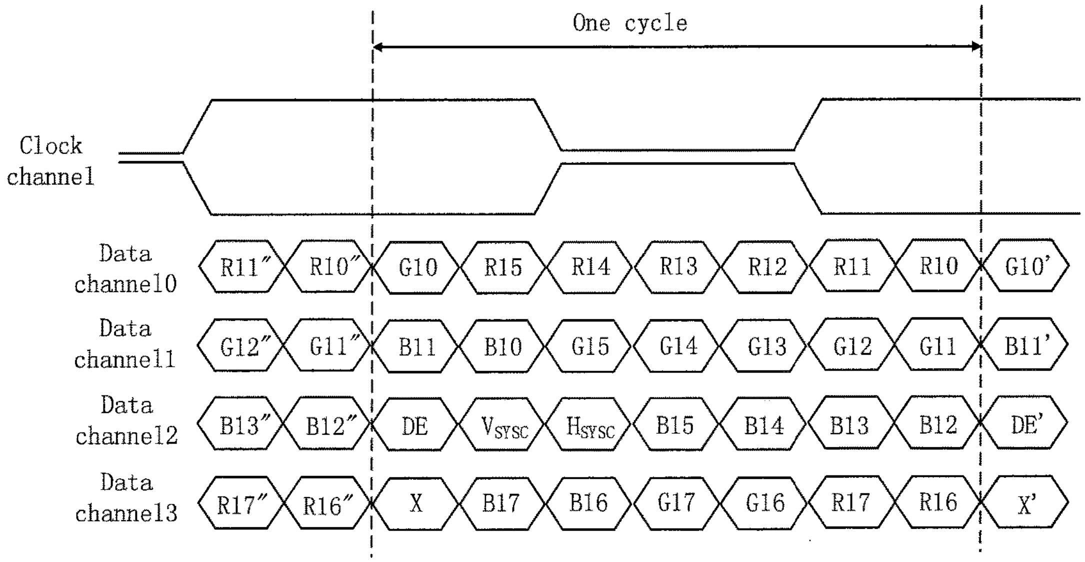
FIG. 12 shows a schematic diagram of a low voltage differential signal in FIG. 11.

For example, the main driver 02 is provided with an LVDS outputting interface circuit which converts a parallel RGB data signal and controlling signal (DE, HSYNC, VSYNC) outputted by the main driver 02 into a serial LVDS signal as shown in FIG. 12. The LVDS signal has four data channels and one clock channel.

Next, as shown in FIG. 9, the first sub storage 310 and the second sub storage 320 may be used to simultaneously input the data signal for sub-pixels of the odd-numbered pixel cells 31 and the even-numbered pixels 32 in the same row to the source driver 40 through 6 channels (6 pairs) of Mini_LVDS data lines.

The display driving system mentioned above may have the same technical effects as the display driving circuit 01 according to the embodiment of the present disclosure, and details are not described herein.

Another embodiment of the present disclosure further provides a display apparatus including a display driving system according to the embodiment of the present disclosure.

In addition, the display apparatus further includes a display panel. The display driving circuit 01 in the display driving system is disposed in a non-display area of the display panel. The non-display area of the display panel is an area on the peripheral of an area where the pixel unit is located on the display panel.

The display apparatus may further include a driving board (not shown). The main driver 02 in the display driving system is disposed on the driving board.

Further, in the embodiments of the present disclosure, the above display apparatus may include a liquid crystal display apparatus or an organic light emitting diode display apparatus. For example, the display apparatus may be any product or component having a display function, such as a display, a television, a digital frame, a cell phone or a tablet.

The display apparatus further includes a backlight module (not shown). As shown in FIG. 2, the processor 10 in the display driving circuit 01 of the display driving system is provided with a pulse width modulation signal port P. The backlight module is connected to the processor 10 through the pulse width adjustment modulation signal port P. Therefore, the processor 10 can adjust the brightness of the backlight module by adjusting the duty cycle of the PWM signal output by the pulse width modulation signal port P, so as to meet the requirements of different users.

Figure 13:
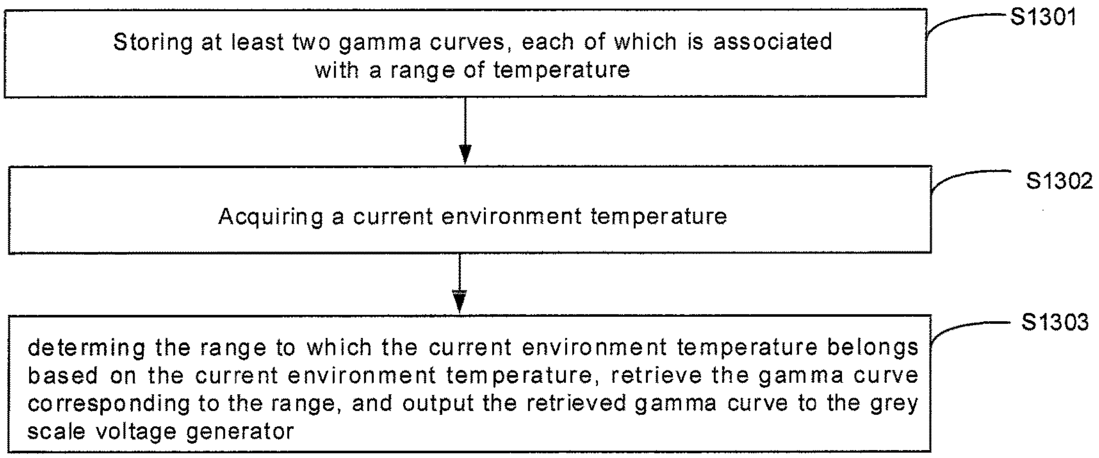
FIG. 13 shows a flowchart of a method of driving the display driving circuit according to an embodiment of the present disclosure.

The disclosed embodiments further provide a method of driving the display driving circuit according to the embodiment of the present disclosure. As shown in FIG. 13, the driving method may include the following steps.

At step S1301, at least two gamma curves are stored, and each of the gamma curves is associated with a range of temperature.

Next, at step S1302, a current ambient temperature is acquired.

At step S1303, the range to which the current ambient temperature belongs is determined according to the current ambient temperature, and the gamma curve associated with the range is retrieved from the stored at least two gamma curves, and the retrieved gamma curve is output to the gray level voltage generator 20.

As shown in FIG. 2, the processor 10 is further provided with a timing controlling signal port T for outputting a timing controlling signal, and the method further includes outputting a timing controlling signal. An example of a timing controlling signal is described above, which is not described herein.

In addition, as shown in FIG. 2, the processor 10 is further provided with a pulse width modulation signal port P, and the above method further comprises outputting a pulse width modulation signal. An example of the pulse width modulation signal is described above, and details are not described herein.

As shown in FIG. 8, the processor 10 is connected to the source driver 40 through six channels (0pair, 1 pair, 2pair, 3pair, 4pair, 5pair) of low-voltage differential (Mini_LVDS) data lines disposed in parallel. The above method may further include the following steps.

First, the LVDS signal is stored.

Next, the data signals for the sub-pixels of the odd-numbered pixel unit 103 among the LVDS signal are addressed progressively. Then the data signal for sub-pixels with one color of the odd-numbered pixel units in one row of pixel units is output to the source driver 40 through one channel of low-voltage differential data line one by one.

At the same time, the data signals for the sub-pixels of the even-numbered pixel unit 104 among the LVDS signal are addressed progressively. Then the data signal for sub-pixels with one color of the even-numbered pixel units in one row of pixel units is output to the source driver 40 through one channel of low-voltage differential data line one by one.

The 6-pair mode mentioned above has a higher efficiency for data transmission. Therefore, for a display panel with a higher resolution, the data signal for sub-pixels in one row can be written into each sub-pixel completely and accurately in a certain scanning time.

The embodiments of the present disclosure provide a computer device including a processor and a memory. The memory stores a computer program executable by the processor, and when executed by the processor, the computer program causes the processor to implement the method of driving any display driving circuit as discussed above.

It should be noted that the above processor may include an FPGA. In this case, the computer program stored in the memory may be a Very-High-Speed Integrated Circuit Hardware (VHDL). The computer program running on the FPGA means that FPGA adjust the FPGA's own internal circuit according to a real logic circuit generated by VHDL, and operate the adjusted circuit.

The embodiments of the present disclosure provide a computer readable medium storing instructions that, when executed by a processor, implement the method of driving any display driving circuit as described above.

It can be understood that the above embodiments are merely exemplary embodiments used for illustrating the principle of the embodiments of the present disclosure, but the scope of the present disclosure are not limited thereto. For those skilled in the art, various variations and improvements may be made without departing from the spirit and essence of the embodiments of the present disclosure, and these variations and improvements are also considered as the scope of the present disclosure. Therefore, the scope of the present disclosure should be defined by the claims.

We claim:

1. A display driving circuit, comprising:

a processor; and a storage, configured to store at least two gamma curves, wherein each of the at least two gamma curves is associated with a range of temperature; and a grey scale voltage generator, electronically connected to the processor; wherein the processor is configured to obtain a current environment temperature, to determine a range to which the current environment temperature belongs based on the current environment temperature; to retrieve the gamma curve associated with the range determined from the storage, and to output the retrieved gamma curve to the grey scale voltage generator, further comprising a source driver, wherein the processor is electronically connected to the source driver through three channels of low voltage differential data lines disposed in parallel and wherein the storage is electronically connected to the source driver and configured to store a low voltage differential signal; wherein the processor is configured to address progressively data signals for sub-pixels among the low voltage differential signal stored in the storage.

2. The display driving circuit of claim 1, wherein the processor is provided with a timing controlling signal port for outputting a timing controlling signal, and the source driver is electronically connected to the processor through the timing controlling signal port.

3. The display driving circuit of claim 1, wherein the processor is further provided with a pulse width modulation signal port.

4. The display driving circuit of claim 1, wherein the processer is electronically connected to the source driver through six channels of low voltage differential data lines disposed in parallel.

5. The display driving circuit of claim 4, wherein the storage comprises a first sub-storage for odd-numbered channels and a second sub storage for even-numbered channels; the first sub storage is configured to storage the low voltage differential signal; and the processor is configured to address progressively the data signals for sub-pixels of odd-numbered pixel units among the low voltage differential signal stored in the first sub storage; and the second sub storage is configured to storage the low voltage differential signal; and the processor is configured to address progressively the data signals for sub pixels of even-numbered pixel units among the low voltage differential signal stored in the second sub storage.

6. The display driving circuit of claim 1, further comprising a power module electronically connected to the processor and the grey scale voltage generator and configured to provide an operating voltage to the processor and the grey scale voltage generator.

7. The display driving circuit of claim 1, wherein the processor is implemented as a Field Programmable Gate Array chip.

8. A display driving system, comprising a main driver and the display driving circuit of claim 1;

wherein the main driver is connected to the processor of the display driving circuit through an interface for a low voltage differential signal.

9. A display apparatus comprising the display driving system of claim 8.

10. The display apparatus of claim 9, further comprising a display panel, and the display driving circuit in the display driving system is disposed in a non-display area of the display panel.

11. The display apparatus of claim 9, further comprising a driving board, and the main driver in the display driving system is disposed on the driving board.

12. The display apparatus of claim 9, further comprising a backlight module, and the processor of the display driving circuit in the display driving system is provided with a pulse width modulation signal port, wherein the backlight module is electronically connected to the processor through the pulse width modulation signal port.

13. A method of driving the display driving circuit of claim 1, comprising: storing at least two gamma curves, wherein each of the at least two gamma curves is associated with a range of temperature; obtaining a current environment temperature; and determining a range to which the current environment temperature belongs, based on the current environment temperature; retrieving the gamma curve associated with range determined from the stored at least two gamma curves, and outputting the retrieved gamma curve to a grey scale voltage generator.

14. The method of claim 13, further comprising outputting a timing controlling signal.

15. The method of claim 13, further comprising outputting a pulse width modulation signal.

16. The method of claim 13, further comprising: storing the low voltage differential signal; addressing progressively data signals for sub-pixels of odd-numbered pixel units among the low voltage differential signal, and outputting the data signals for sub pixels with one color of the odd-numbered pixel units in a row of pixel units to a source driver through a channel of low voltage differential data line one by one; and addressing, simultaneously, the data signal for sub pixels of even-numbered pixel units among the low voltage differential signal progressively, and outputting the data signal for sub pixels with one color of the even-numbered pixel units in a row of pixel units to the source driver through a channel of low voltage differential data line one by one.

17. A computer device comprising a memory and a processor, the memory storing a computer program executable by the processor, and when executed by the processor, the computer program causes the processor to implement the method of claim 13.

18. A non-transitory computer readable medium storing instructions that, when executed by a processor, implement the method of claim 13.

* * * * *